United States Patent [19]

Ichihashi et al.

[11] Patent Number: 4,860,792
[45] Date of Patent: Aug. 29, 1989

[54] ELECTROMAGNETIC CONTROL VALVE

[75] Inventors: Kouji Ichihashi; Akira Inaba, both of Higashimatsuyama, Japan

[73] Assignee: Diesel Kiki Co., Ltd., Tokyo, Japan

[21] Appl. No.: 234,165

[22] Filed: Aug. 19, 1988

[30] Foreign Application Priority Data

Sep. 10, 1987 [JP] Japan .................. 62-225242

[51] Int. Cl.$^4$ ............................................. F15B 13/06
[52] U.S. Cl. .................................. 137/596.17; 74/878; 137/637.1; 192/87.14
[58] Field of Search ................. 137/596.16, 596.17, 137/637.1; 74/878; 192/87.14

[56] References Cited

U.S. PATENT DOCUMENTS

| | | | |
|---|---|---|---|
| 3,289,701 | 12/1966 | Booth et al. | 137/596.17 X |
| 4,492,251 | 1/1985 | Blake | 137/596.16 |
| 4,616,674 | 10/1986 | Bardoll | 137/596.16 X |
| 4,617,967 | 10/1986 | Read et al. | 137/596.17 X |
| 4,619,187 | 10/1986 | Blake et al. | 137/596.16 X |
| 4,643,225 | 2/1987 | Imhof | 137/596.17 |
| 4,729,408 | 3/1988 | Coutant | 137/637.1 |
| 4,763,872 | 8/1988 | Ichihashi et al. | 251/57 X |

Primary Examiner—Gerald A. Michalsky
Attorney, Agent, or Firm—Wegner & Bretschneider

[57] ABSTRACT

In an electromagnetic control valve, a pair of spools are accommodated within a guide bore in a housing in coaxial relation to each other for axial movement relative to the housing. First and second flow passageways are formed in the housing. Flow of hydraulic fluid through the first flow passageway and flow of hydraulic fluid through the second flow passageway are controlled respectively by the pair of spools independently of each other. Movements of the respective spools are controlled respectively by a pair of electromagnetic drive units independently of each other. The pair of spools have their respective inner ends facing toward each other. The inner ends are spaced away from each other when the pair of spools are in their respective initial positions. Moving regions of the respective inner ends are at least partially overlapped with each other.

2 Claims, 3 Drawing Sheets

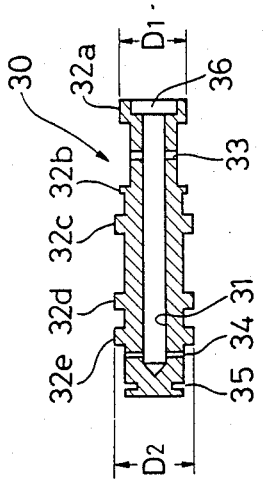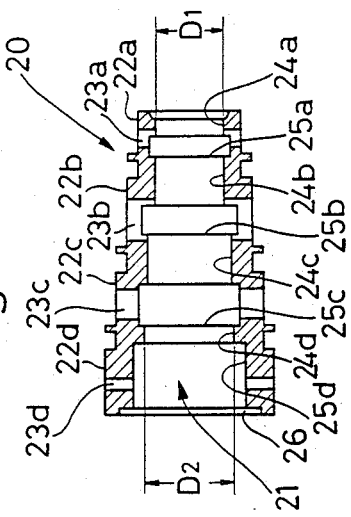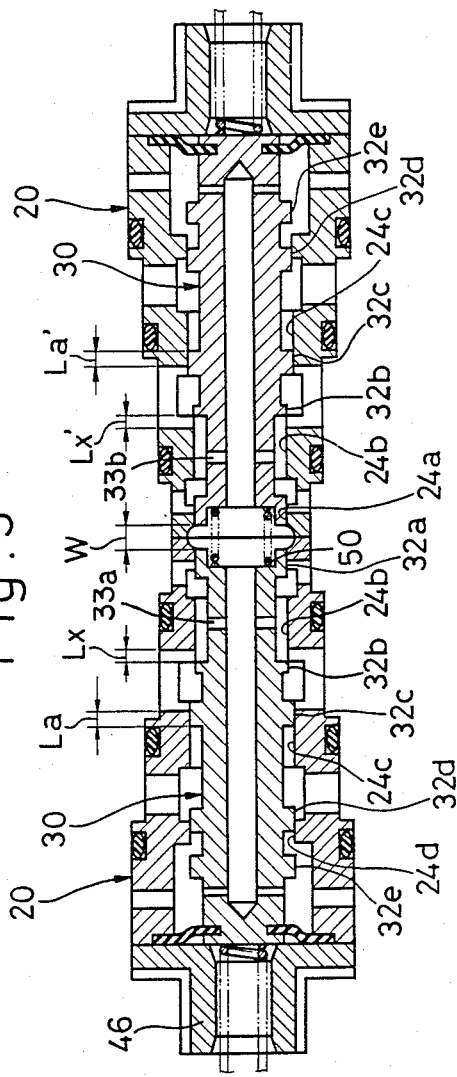

ELECTROMAGNETIC CONTROL VALVE

BACKGROUND OF THE INVENTION

The present invention relates to an electromagnetic control valve.

A general or usual clutch device for tractors comprises a forward clutch mechanism and a rearward clutch mechanism hydraulically controlled respectively by a pair of electromagnetic proportional pressure control valves which are independent of each other. By the way, should the forward and rearward clutch mechanisms be brought simultaneously to their respective ON positions, such an inconvenience would arise that a gear train associated with the clutch mechanisms is destroyed. Accordingly, the arrangement is such that a control circuit having a microcomputer or the like is provided for prohibiting that both the clutch mechanisms are brought simultaneously to their respective ON positions. With such arrangement, however, there may be a case where the fine or minute dust enters an interface between a spool of, for example, one control valve and a housing thereof within which the spool is accommodated for axial movement, so that the spool is made immovable and, as a result, the clutch mechanism associated with the one control valve can no longer be switched from the ON position to the OFF position, in spite of the fact that the control circuit brings the one control valve to the unexcited state. In this case, when the clutch mechanism associated with the one control valve is in its ON position, regular or normal operation of the electromagnetic valve associated with the other clutch mechanism brings the other clutch mechanism to its ON position, thereby causing the above-mentioned inconvenience.

As the prior art of the present invention, an electromagnetic control valve is known, in which a plurality of spools are accommodated within a single housing. The spools are controlled in movement respectively by a plurality of electromagnetic drive means to control respective flow passageway means formed in the housing correspondingly respectively to the spools, in turn, to control a plurality of subjects to be controlled which are associated respectively with the flow passageway means. Since the spools in this control valve are not arranged in coaxial relation to each other and do not interfere mechanically with each other, the control valve is different from a control valve according to the present invention subsequently to be described.

Japanese Patent Application Laid-Open No. 59-58285 discloses, in FIG. 2, an electromagnetic proportional pressure control valve in which a pair of spools are accommodated within a housing in coaxial relation to each other. These spools are controlled respectively by a pair of electromagnetic drive means which are independent of each other. A pair of stoppers are arranged between inner ends of the respective spools which face toward each other. The inner end of each of the pair of spools is engageable with a corresponding one of the pair of stoppers, so that movement of the spool toward the center of the housing is restricted by the stopper. The control valve disclosed in the above Japanese patent is different from that according to the present invention in that the pair of spools have their respective moving regions which are spaced away from each other, are independent of each other and do not interfere mechanically with each other, and that the pair of spools control a single subject.

Japanese Patent Application Laid-Open No. 55-14360 which corresponds to U.S. Pat. Nos. 4,281,682 and 4,282,901, and Japanese Patent Application Laid-Open No. 62-98409 disclose an electromagnetic proportional pressure control valve in which a pair of spools are accommodated within a housing in coaxial relation to each other. In this control valve, the pair of spools have their respective inner ends which face toward each other in spaced relation or through a coil spring. The control valve disclosed in the above patents is different from that according to the present invention in that moving regions of the respective spools are not overlapped with each other and do not interfere mechanically with each other, and that the pair of spools are controlled by a single electromagnetic drive means, as a consequence, to control a single subject.

SUMMARY OF THE INVENTION

It is an object of the invention to provide an electromagnetic control valve which, normally, can control a pair of subjects to be controlled, independently of each other respectively by a pair of electromagnetic drive means, and which can ensure to prohibit particular control states of the pair of subjects by a mechanical arrangement.

According to the invention, there is provided an electromagnetic control valve comprising:

(a) housing means provided therein with a straight extending guide bore;

(b) a pair of spools accommodated within the guide bore of the housing means in coaxial relation to each other for axial movement relative to the housing means, wherein the pair of spools have their respective inner ends facing toward each other, the inner ends being spaced away from each other when the pair of spools are in their respective initial positions, and wherein moving regions of the respective inner ends are at least partially overlapped with each other;

(c) first and second flow passageway means formed in the housing means, flow of hydraulic fluid through the first flow passageway means and flow of hydraulic fluid through the second flow passageway means being controlled respectively by the pair of spools independently of each other; and (d) a pair of electromagnetic drive means mounted to the housing means for controlling movements of the respective spools independently of each other.

BRIEF DESCRIPTION OF THE DRAWINGS

FIG. 3 is a cross-sectional view of only one of a pair of sleeves incorporated in the electromagnetic proportional pressure control valve illustrated in FIG. 1;

FIG. 4 is a cross-sectional view of only one of a pair of spools incorporated in the electromagnetic proportional pressure control valve illustrated in FIG. 1; and FIG. 5 is an enlarged cross-sectional view showing the pair of sleeves, the pair of spools and a pair of stoppers in the electromagnetic proportional pressure control valve illustrated in FIG. 1.

DETAILED DESCRIPTION

Figure 1:
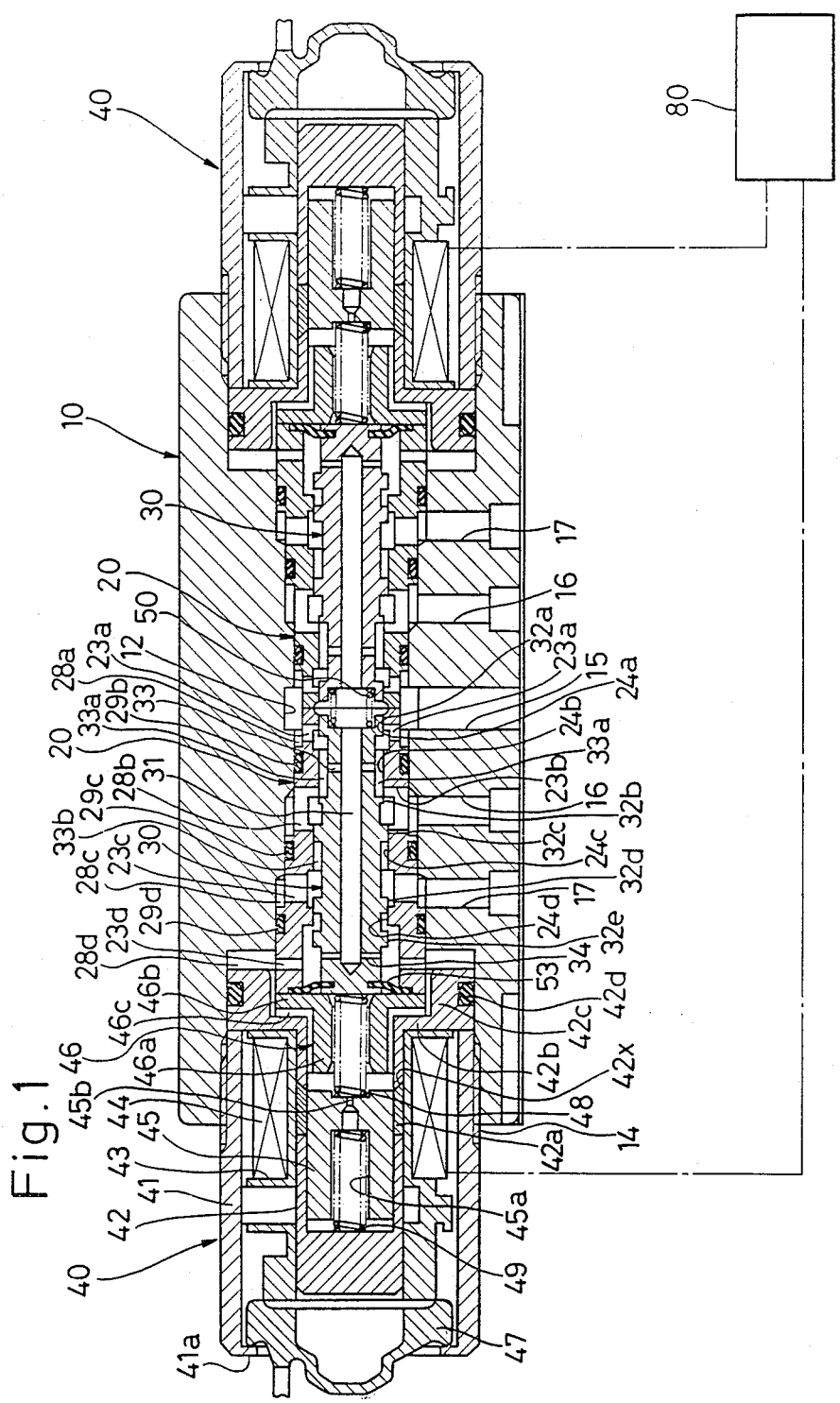
FIG. 1 is a cross-sectional view of an electromagnetic proportional pressure control valve according to an embodiment of the invention.

Referring to FIG. 1, there is shown an electromagnetic proportional pressure control valve according to an embodiment of the invention. The electromagnetic proportional pressure control valve comprises a hollow body 10, a pair of sleeves 20 and 20 fixedly accommodated within the body 10, a pair of spools 30 and 30 slidably accommodated respectively within the pair of sleeves 20 and 20, and a pair of electromagnetic drive means 40 and 40 for controlling movements of the respective spools 30 and 30 independently of each other. The body 10 cooperates with the pair of sleeves 20 and 20 to form a housing. As seen from FIG. 1, right- and left-hand half portions of the electromagnetic proportional pressure control valve are symmetric in configuration to each other.

Figure 2:
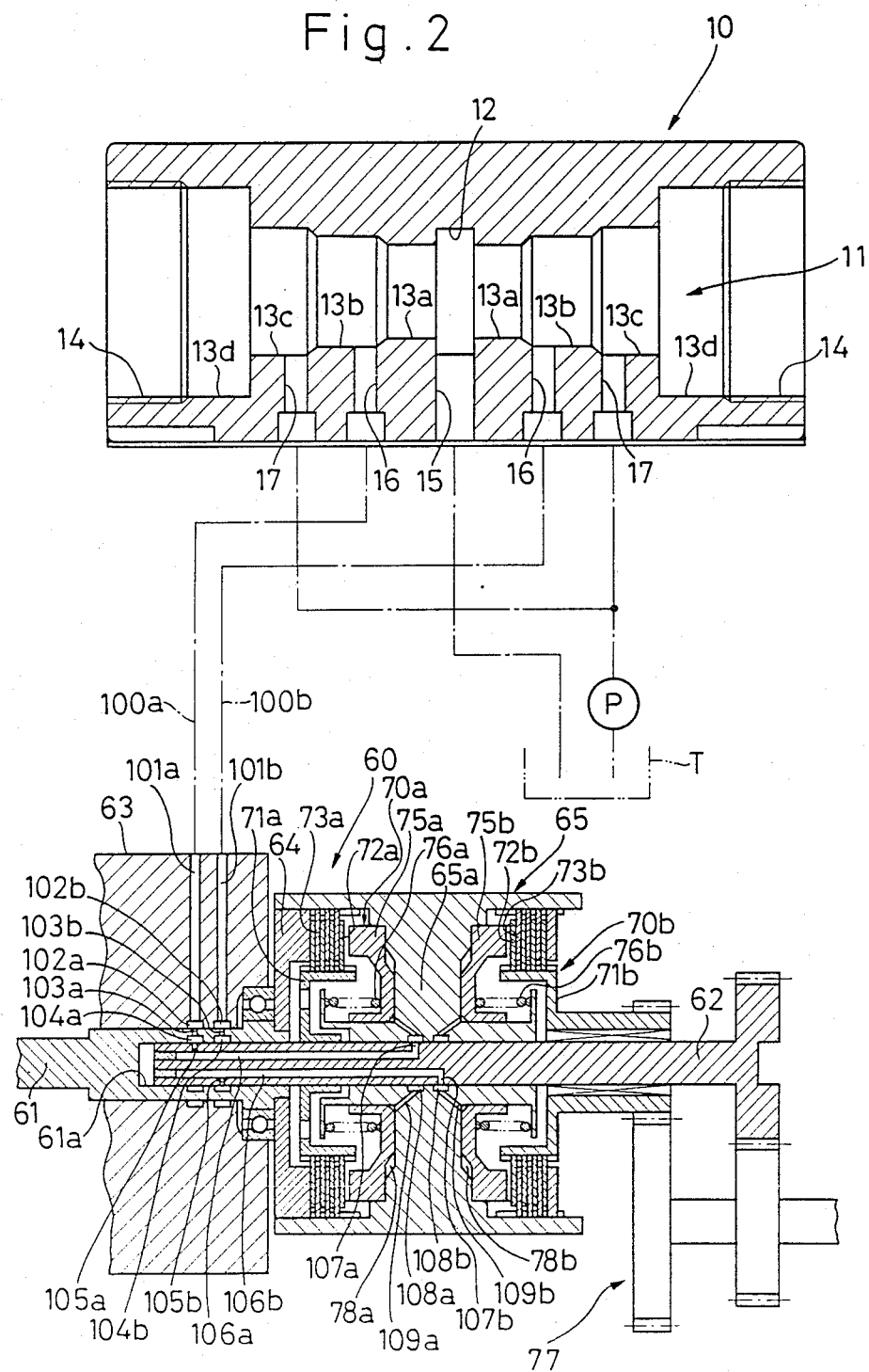
FIG. 2 is a cross-sectional view of only a body of the electromagnetic proportional pressure control valve illustrated in FIG. 1, and a clutch device associated with the body.

As best shown in FIG. 2, the body 10 is formed therein with an insertion bore 11 which extends straight. The insertion bore 11 has its axial opposite ends which open respectively to opposite end faces of the body 10. An annular groove 12 is formed in an axially central portion of a peripheral wall surface of the insertion bore 11. Each of right- and left-hand half portions of the insertion bore 11 is formed into a stepped bore increasing in diameter from the annular groove 12 toward a corresponding one of the axial opposite end faces of the body 10. Specifically, each of the right- and left-hand half portions of the insertion bore 11 is provided with a first section 13a, a second section 13b, a third section 13c and a fourth section 13d which are arranged in order from the annular groove 12 toward a corresponding one of the axial opposite end faces of the body 10. Threads 14 are formed on a portion of the peripheral wall surface of the insertion bore 11, which is located adjacent each of the axial opposite end faces of the body 10.

A radially extending, single tank port 15 is formed in the peripheral wall of the body 10 at the axial center thereof. The tank port 15 has one end thereof which opens to an outer peripheral surface of the body 10 and which is connected to a tank T. The other end of the tank port 15 is in communication with the annular groove 12.

A pair of radially extending, right- and left-hand stepped actuator ports 16 and 16 are formed in the peripheral wall of the body 10 on both sides of the tank port 15. The pair of actuator ports 16 and 16 have their respective one ends which open to the outer peripheral surface of the body 10. The one ends of the respective actuator ports 16 and 16 are operatively connected respectively to forward and rearward clutch mechanisms of the clutch device which are subjects to be controlled, subsequently to be described. Each of the other ends of the respective actuator ports 16 and 16 opens to a corresponding one of the second sections 13b and 13b of the peripheral wall surface of the insertion bore 11.

Moreover, a pair of radially extending, right- and left-hand stepped pump ports 17 and 17 are formed in the peripheral wall of the body 10 and are located respectively between the pair of actuator ports 16 and 16 and the axial opposite end faces of the body 10. The pair of pump ports 17 and 17 have their respective one ends which open to the outer peripheral surface of the body 10 and which are connected to a common pump P. The other ends of the respective pump ports 17 and 17 open respectively to the third sections 13c and 13c.

As shown in FIG. 1, the pair of sleeves 20 and 20 are received respectively in right- and left-hand half portions of the insertion bore 11 in the body 10 in coaxial relation to each other. Opposed end faces of the respective sleeves 20 and 20 are abutted against each other.

As particularly best shown in FIG. 3, each sleeve 20 is provided therein with a guide bore 21 extending axially. The sleeve 20 has its outer diameter which increases stepwise from the axial center of the body 10 toward the axial end face thereof. That is, the outer peripheral surface of the sleeve 20 is composed of first to fourth sections 22a through 22d.

The first section 22a of the outer peripheral surface of the sleeve 20 is smaller in diameter than the first section 13a of the peripheral wall surface of the insertion bore 11, so that an annular gap 28a (see FIG. 1) is defined between both the first sections 22a and 13a.

The second section 22b of the outer peripheral surface of the sleeve 20 is substantially equal in diameter to the first section 13a of the peripheral wall surface of the insertion bore 11. An interface between the second section 22b and the first section 13a is sealed by an O-ring 29b (see FIG. 1). An annular gap 28b (see FIG. 1) is defined between the second section 22b and the second section 13b of the peripheral wall surface of the insertion bore 11.

The third section 22c of the outer peripheral surface of the sleeve 20 is substantially equal in diameter to the second section 13b of the peripheral wall surface of the insertion bore 11. An interface between the third section 22c and the second section 13b is sealed by an O-ring 29c (see FIG. 1). An annular gap 28c (see FIG. 1) is defined between the third section 22c and the third section 13c of the peripheral wall surface of the insertion bore 11.

The fourth section 22d of the outer peripheral surface of the sleeve 20 is substantially equal in diameter to the third section 13c of the peripheral wall surface of the insertion bore 11. An interface between the fourth section 22d and the third section 13c is sealed by an O-ring 29d (see FIG. 1). An annular gap 28d (see FIG. 1) is defined between the fourth section 22d and the fourth section 13d of the peripheral wall surface of the insertion bore 11.

The peripheral wall of the sleeve 20 is formed therein with four pairs of radially extending auxiliary ports 23a through 23d in such a manner that each pair of auxiliary ports are diametrically opposed to each other. The four pairs of auxiliary ports 23a through 23d bring the respective annular gaps 28a through 28d defined between the sleeve 20 and the body 10, into communication with the guide bore 21 in the sleeve 20.

Four annular grooves 25a through 25d are formed in the inner peripheral surface of the sleeve 20 and communicate respectively with the auxiliary ports 23a through 23d. By these four annular grooves 25a through 25d, the inner peripheral surface of the sleeve 20 is divided into four sections 24a through 24d arranged in order from the axial center of the body 10 toward the axial end face thereof. Each of the two sections 24a and 24b adjacent the axial center of the body 10 has an inner diameter $D_1$ which is smaller than that $D_2$ of each of the two sections 24c and 24d remote from the axial center of the body 10. An annular attaching recess 26 is formed in the end face of the sleeve 20 remote from the axial center of the body 10.

It is to be understood that although FIG. 3 shows only the left-hand sleeve 20 in FIG. 1, the right-hand sleeve 20 is the same in configuration as the left-hand sleeve 20. Thus, the detailed description of the right-hand sleeve 20 will be omitted.

As particularly best shown in FIG. 4, each of the pair of spools 30 has an axial bore 31 and is hollow. The spool 30 has an outer peripheral surface which is formed into first to fifth annular lands 32a through 32e arranged in order from the axial center of the body 1 toward the end face thereof. Each of the first and second lands 32a and 32b adjacent the axial center of the body 10 has an outer diameter substantially equal to the diameter $D_1$ of each of the first and second sections 24a and 24b of the inner peripheral surface of the sleeve 20. Each of the third, fourth and fifth lands 32c, 32d and 32e remote from the axial center of the body 10 has a diameter substantially equal to the diameter $D_2$ of each of the third and fourth sections 24c and 24d of the inner peripheral surface of the sleeve 20. A pair of radially extending auxiliary ports 33 are formed in the peripheral wall of the spool 30 in diametrically opposed relation to each other and are located between the lands 32a and 32b. Likewise, another pair of auxiliary ports 34 are formed in the peripheral wall of the spool 30 and are located between the fifth land 32e and the outer end face of the spool 30 remote from the axial center of the body 10. Further, an annular attaching groove 35 is formed in a portion of the outer peripheral surface of the spool 30 extending between the auxiliary ports 34 and the outer end face of the spool 30. An accommodating recess 36 is formed in the inner end face of the spool 30 adjacent the axial center of the body 10.

It is to be understood that although FIG. 4 shows only the left-hand spool 30 in FIG. 1, the right-hand spool 30 is the same in configuration as the left-hand spool 30. Thus, the detailed description of the right-hand spool 30 will be omitted.

As shown in FIG. 1, each of the pair of spools 30 is accommodated within the guide bore 21 in a corresponding one of the pair of sleeves 20. The first land 32a of the spool 30 is always in contact with the first section 24a of the inner peripheral surface of the sleeve 20 regardless of the axial position of the spool 30.

In response to axial movement of the spool 30, the second land 32b thereof is movable between a contact position where the second land 32b is brought into contact with the second section 24b of the inner peripheral surface of the sleeve 20, and a non-contact position where the second land 32b is spaced away from the second section 24b. In the non-contact position, the tank port 15 and the actuator port 16 are brought into communication with each other through the annular groove 12 in the body 10, the annular gap 28a between the body 10 and the sleeve 20, the auxiliary port 23a in the sleeve 20, an annular gap 33a between the sleeve 20 and the spool 30, the auxiliary port 23b of the sleeve 20, and annular gap 28b between the body 10 and the sleeve 20. On the other hand, in the contact position, the passage between the tank port 15 and the actuator port 16 is closed.

In response to axial movement of the spool 30, the third land 32c thereof is movable between a contact position where the third land 32c is brought into contact with the third section 24c of the inner peripheral surface of the sleeve 20, and a non-contact position where the third land 32c is spaced away from the third section 24c. In the non-contact position, the actuator port 16 and the pump port 17 are brought into communication with each other through the annular gap 28b between the body 10 and the sleeve 20, the auxiliary port 23b in the sleeve 20, an annular gap 33b between the sleeve 20 and the spool 30, the auxiliary port 23c of the sleeve 20, and the annular gap 28c between the body 10 and the sleeve 20. On the other hand, in the contact position, the passage between the actuator port 16 and the pump port 17 is closed.

At least one of the fourth and fifth lands 32d and 32e of the spool 30 is always in contact with the fourth section 24d of the sleeve 20, regardless of the axial position of the spool 30.

As shown in FIG. 1, the pair of electromagnetic drive means 40 and 40 mounted to the body 10 are the same in construction as each other. Each drive means 40 has a casing 41 threadedly engaged with the threads 14 at a corresponding one of the axial opposite ends of the insertion bore 11 in the body 10. The casing 41 is tubular in shape, and a tubular stator 42 is arranged within the casing 41. The tubular stator 42 is closed at its outer end remote from the axial center of the body 10. A tubular nonmagnetic winding frame 43 is arranged about an outer peripheral surface of the stator 42, and a coil or solenoid 44 is arranged about an outer peripheral surface of the winding frame 43. An armature 45 is accommodated within the stator 42 for axial sliding movement relative thereto.

The stator 42 has a central tubular portion 42a which is formed of nonmagnetic material. Portions of the stator 42 on both sides of the central tubular portion 42a are formed of magnetic material. A radially extending flange 42b is formed at the inner end of the stator 42. An auxiliary tubular section 42c thick in wall thickness is formed at the flange 42b and extends therefrom axially toward the axial center of the body 10. An O-ring 42d is provided for sealing the interface between the auxiliary tubular section 42c and the fourth section 13d (see FIG. 3) of the peripheral wall surface of the insertion bore 11.

The solenoids 44 and 44 of the respective electromagnetic drive means 40 and 40 are supplied with drive electric current from a control circuit 80, which is variable in magnitude. The central nonmagnetic tubular portion 42a and the adjacent magnetic portion of each stator 42 closer to the axial center of the guide bore 11 than the central nonmagnetic tubular portion 42a are connected to each other through an annular tapered face 42x. Accordingly, in a predetermined axial moving region of each armature 45, the force applied to the armature 45 due to the solenoid 44 is proportional to the drive electric current.

A stopper 46 is arranged between the stator 42 and the sleeve 20. The stopper 46 is composed of a tubular section 46a and a flange 46b extending radially outwardly from an inner end of the tubular section 46a. The tubular section 46a of the stopper 46 is accommodated within the stator 42, while the flange 46b is clamped between the flange 42b of the stator 42 and the outer end of the sleeve 20. The stopper 46 is formed with a plurality of L-shaped grooves 46c which extend axially along the outer peripheral surface of the tubular section 46a and radially along the end face of the flange 46b remote from the axial center of the body 10.

The outer end of the casing 41 is closed by a cover 47. When the pair of casings 41 and 41 are screwed respectively into the axial opposite ends of the body 10, the pair of sleeves 20 and 20 are urged toward the axial center of the insertion bore 11 respectively through flanges 41a formed at the outer ends of the respective casings 41, the covers 47, the winding frames 43, the flanges 42b on the respective stators 42, and the flanges 46b of the respective stoppers 46, so that the inner ends of the respective sleeves 20 and 20 are abutted against each other. In this manner, the casings 41, the covers 47, the winding frames 43, the stators 42, the stoppers 46 and the sleeves 20 are fixedly accommodated within the body 10.

A coil spring 48 is accommodated within each of the stoppers 46 and is extremely high in spring constant. The coil spring 48 is arranged between the armature 45 and the spool 30, and normally is compressed extremely slightly so that the coil spring 48 serves to transmit force between the armature 45 and the spool 30. In this connection, it is to be understood that the coil spring 48 may be replaced by a rigid rod.

The armature 45 is formed therein with an accommodating bore 45a. A coil spring 49 is accommodated under compression within the accommodating bore 45a. The coil spring 49 is extremely low in spring constant, and serves to always abut the armature 45 against the coil spring 48 when the solenoid 44 is in an unexcited state.

Another coil spring 50 is arranged under compression between the pair of spools 30 and 30. The coil spring 50 has its axial opposite ends which are received respectively in the accommodating recesses 36 formed in the inner end faces of the respective spools 30 and 30. The coil spring 50 is higher in spring constant than the coil spring 49, but is considerably lower in spring constant than the coil spring 48. The coil spring 50 serves to bias the pair of spools 30 and 30 away from each other, i.e., toward the respective opposite end faces of the body 10, to abut the pair of spools 30 and 30 against the respective stoppers 46 and 46, when the solenoids 40 and 40 are in their respective unexcited states.

A chamber within the stator 42 is filled with hydraulic fluid or oil to lubricate the interface between the armature 45 and the stator 42. The armature 45 is formed therein with an orifice 45b communicating with the accommodating bore 45a. When the armature 45 is moved axially, the hydraulic fluid is caused to pass through the orifice 45b. Flow resistance during passage of the hydraulic fluid through the orifice 45b restricts or limits abrupt axial movement of the armature 45.

The tank port 15 communicates with the chamber within the stator 42 through the annular groove 12 of the body 10, the auxiliary port 23a of the sleeve 20, the annular gap 33a between the sleeve 20 and the spool 30, the auxiliary ports 33 of the spool 30, the axially extending bore 31, the auxiliary ports 34, the auxiliary ports 23d formed in the sleeve 20, the annular gap 28d between the body 10 and the sleeve 20, the annular gap between the sleeve 20 and the auxiliary tubular section 42c of the stator 42, and the grooves 46c of the stopper 46.

A diaphragm 53 has an outer peripheral edge secured to the annular attaching recess 26 (see FIG. 3) in the outer end face of the sleeve 20. An inner peripheral edge of the diaphragm 53 is fixedly inserted into the attaching groove 35 (see FIG. 4) at the outer end of the spool 30. By the diaphragm 53, the hydraulic fluid is prohibited from flowing through the hollow portion of the tubular section 46a of the stopper 46, but flows between the tank port 15 and the chamber within the stator 42 through the above-mentioned narrow bypass passageway. Accordingly, a fine or minute dust mixed with the hydraulic fluid is caught at the narrow bypass passageway, and is made difficult to enter the stator 42.

The electromagnetic proportional pressure control valve constructed as above can be used, for example, to control a clutch device 60 for tractors as shown in FIG. 2. The clutch device 60 is known, and will be described below briefly.

The clutch device 60 comprises an input shaft 61 and an output shaft 62 arranged in coaxial relation to each other. The input shaft 61 is rotatably supported by a support member 63. An axial bore 61a is formed in a right-hand end of the input shaft 61 as viewed in FIG. 2. The output shaft 62 has a left-hand end portion which is rotatably received in the bore 61a. A flywheel 64 is fixedly mounted to the right-hand end of the input shaft 61. A clutch outer 65 is fixedly mounted to the flywheel 64. The clutch outer 65 is formed with a partition wall 65a. The output shaft 62 extends rotatably through the center of the partition wall 65a.

A forward clutch mechanism 70a and a rearward clutch mechanism 70b are accommodated within the clutch outer 65 and are arranged respectively on both sides of the partition wall 65a. The clutch mechanisms 70a and 70b comprise respectively clutch inners 71a and 71b, clutch discs 72a and 72b supported by the clutch inners 71a and 71b for axial movement, clutch discs 73a and 73b supported by the clutch outer 65 for axial movement, pressure plates 75a and 75b, and coil springs 76a and 76b.

The clutch inner 71a of the forward clutch mechanism 70a is spline-coupled to the output shaft 62 against rotation relative thereto. On the other hand, the clutch inner 71b of the rearward clutch mechanism 70b is supported by the output shaft 62 for rotation relative thereto. Rotation of the clutch inner 71b is reversed by a gear train 77 and is transmitted to the output shaft 62.

A pair of hydraulic chambers 78a and 78b are defined between the respective pressure plates 75a and 75b and the partition wall 65a of the clutch outer 65. The pair of actuator ports 16 and 16 of the electromagnetic proportional pressure control valve are connected respectively to the hydraulic chambers 78a and 78b through pipes 100a and 100b, passages 101a and 101b formed in the support member 63, annular grooves 102a and 102b formed in the inner peripheral surface of the support member 63, radially extending ports 103a and 103b formed in the input shaft 61, annular grooves 104a and 104b formed in the inner peripheral surface of the input shaft 61, radially extending ports 105a and 105b formed in the output shaft 62, axially extending passages 106a and 106b, radially extending ports 107a and 107b, annular grooves 108a and 108b formed in the inner peripheral surface of the clutch outer 65, and passages 109a and 109b formed in the clutch outer 65.

In such a state that no hydraulic fluid is supplied to the hydraulic chamber 78a from the left-hand actuator port 16 of the electromagnetic proportional pressure control valve, the pressure plate 75a in the forward clutch mechanism 70a is biased by the coil spring 76a toward the partition wall 65a of the clutch outer 65, so that the pressure plate 75a does not urge the clutch discs 72a and 73a. Accordingly, the forward clutch mechanism 70a is in an OFF position where no rotation is transmitted to the output shaft 62 from the input shaft 61. When hydraulic pressure is applied to the hydraulic chamber 78a, the pressure plate 75a urges the clutch discs 72a and 73a against the biasing force of the coil spring 76a. As a consequence, the forward clutch mechanism 70a is brought to an ON position where rotation is transmitted to the output shaft 62 from the input shaft 61 through the flywheel 64, the clutch outer 65, the clutch discs 72a and 73a and the clutch inner 71a.

In such a state that no hydraulic pressure is supplied to the hydraulic chamber 78b of the rearward clutch mechanism 70b from the right-hand actuator port 16 of the electromagnetic proportional pressure control valve, the pressure plate 75b does not urge the clutch discs 72b and 73b. Accordingly, the rearward clutch mechanism 70b is in an OFF position where no rotation is transmitted to the output shaft 62 from the input shaft 61. When the hydraulic pressure is applied to the hydraulic chamber 78b, the pressure plate 75b urges the clutch discs 72b and 73b against the biasing force of the coil spring 76b. This brings the rearward clutch mechanism 70b to an ON position where rotation is transmitted to the output shaft 62 from the input shaft 61 through the flywheel 64, the clutch outer 65, the clutch discs 72b and 73b, the clutch inner 71b and the gear train 77.

The operation of the electromagnetic proportional pressure control valve will next be described below in detail with reference particularly to FIG. 5. When both the solenoids 44 and 44 of the respective electromagnetic drive means 40 and 40 are in their respective unexcited states, the pair of spools 30 and 30 are abutted respectively against the stoppers 46 and 46 under the biasing force of the coil spring 50, and the opposed inner ends of the respective spools 30 and 30 are spaced a distance W away from each other. In this initial position, the second lands 32b and 32b on the outer peripheral surfaces of the respective spools 30 and 30 are spaced respectively away from the second sections 24b and 24b of the inner peripheral surfaces of the respective sleeves 20 and 20, by respective axial distances $L_X$ and $L_X'$ (in the illustrated embodiment, $L_X = L_X'$). The third lands 32c and 32c of the respective spools 30 and 30 are in contact respectively with the third sections 24c and 24c of the inner peripheral surfaces of the respective sleeves 20 and 20 through respective axial distances $L_a$ and $L_a'$ (in the illustrated embodiment, $L_a = L_a'$) Accordingly, the pair of actuator ports 16 and 16 are brought out of communication respectively with the pump ports 17 and 17, but into communication with the tank port 15. Thus, both the forward clutch mechanism 70a and the rearward clutch mechanism 70b are in their respective OFF positions.

The above-mentioned distances W, $L_a$, $L_a'$, $L_X$ and $L_X'$ have the following relationships:

$W > L_a$;

$W > L_a'$;

$W \leq L_a + L_a'$;

$L_a \geq L_X$; and $L_a' \geq L_X'$.

When each of the spools 30 and 30 is in its initial position, the hydraulic pressure from the pump P is applied to the third and fourth lands 32c and 32d of the spool 30. Since, however, both the lands 32c and 32d are equal in diameter or pressure receiving area to each other, forces due to the pressure applied to the lands 32c and 32d, which are opposite to each other, are maintained balanced with each other. Accordingly, it is possible for the relatively weak coil spring 50 to maintain the spool 30 at the initial position.

When the left-hand solenoid 44 is excited, the left-hand armature 45 is moved under the magnetic force of the solenoid 44 toward the right, that is, toward the stopper 46. At this time, the left-hand armature 45 urges the left-hand spool 30 through the coil spring 48 high in spring constant. When the spool 30 is moved by the distance $L_X$ from the aforesaid initial position, the passage between the left-hand actuator port 16 and tank port 15 is closed. When the spool 30 is further moved by the distance $L_a$ from the initial position, the left-hand actuator port 16 and pump port 17 are brought into communication with each other. By this communication, the hydraulic pressure begins to rise at the left-hand actuator port 16. The left-hand spool 30 is once moved the distance W from the initial position, and is abutted against the right-hand spool 30.

When the left-hand actuator port 16 is brought out of communication with the tank port 15, but into communication with the pump port 17, the hydraulic pressure rises at the actuator port 16. At this time, the hydraulic pressure is also applied to the opposed faces of the respective second and third lands 32b and 32c, so that the difference in pressure receiving area between them produces a force returning the spool 30 toward the initial position against the magnetic force of the solenoid 44. When the force due to the hydraulic pressure slightly overcomes the exciting force of the solenoid 44, the spool 30 is moved toward the initial position, so that the passage between the actuator port 16 and the pump port 17 is closed. However, the spool 30 is not returned to the initial position, but remains at a position where the amount of movement from the initial position takes a value between $L_a$ and $L_X$, thereby making it possible to maintain the actuator port 16 and the tank port 15 out of communication with each other.

Since the exciting force of the solenoid 44 acting on the armature 45 or the spool 30 is proportional to the drive current, the hydraulic pressure at the actuator port 16 is proportional to the magnitude of the drive current.

When the drive current is further raised from this state by the control circuit 80, the spool 30 is moved away from the initial position, whereby the actuator port 16 and the pump port 17 are brought into communication with each other until the hydraulic pressure at the actuator port 16 rises to a value corresponding to the drive current. On the other hand, when the drive current is lowered, the spool 30 is moved toward the initial position, whereby the actuator port 16 and the tank port 15 are brought into communication with each other until the hydraulic pressure at the actuator port 16 decreases to a value corresponding to the drive current.

As described above, as the pressure at the left-hand actuator port 16 rises, the pressure plate 75a of the forward clutch mechanism 70a which has been in the OFF position, is moved toward the clutch discs 72a and 73a by the hydraulic pressure. As a consequence, rotation is transmitted to the output shaft 62 from the input shaft 61. This rotation transmission ratio is determined by the amount of movement of the pressure plate 75a, in other words, by the hydraulic pressure at the actuator port 16, further in other words, by the magnitude of the drive current to the solenoid 44. When the drive current reaches a given value, the forward clutch mechanism 70a is brought completely to the ON position, so that the rotation transmission ratio becomes 100% (slip ratio: 0%).

When the solenoid 44 of the right-hand electromagnetic drive means 40 is excited, the right-hand spool 30 is moved from the initial position in a manner similar to the case described above, thereby controlling the hydraulic pressure at the actuator port 16 to a value corresponding to the drive current to the solenoid 44. Thus, the rearward clutch mechanism 70b is switched from the OFF position to the ON position.

It will be seen from the above description that the distance W, by which the inner ends of the respective spools 30 and 30 are spaced away from each other when the spools are in their respective initial positions, is equal to the entire moving region of the inner end of each spool 30, in other words, the moving regions of the inner ends of the respective spools 30 and 30 are completely overlapped with each other.

Supply of the drive current to the pair of solenoid 44 and 44 is controlled by the control circuit 80 in such a manner that both the solenoid 44 and 44 are not simultaneously excited and, accordingly, the forward and rearward clutches 70a and 70b are not simultaneously brought to their respective ON positions. However, there may be a case where one spool 30 is not returned to the initial position so that the corresponding clutch mechanism 70a (or 70b) is maintained at the ON position, in spite of the fact that the solenoid 44 is turned off by the control circuit 80, for example, when a minute or fine dust enters the interface between the one spool 30 and the corresponding sleeve 20 so that the one spool 30 is made immovable, or when a fine or minute dust enters the interface between the corresponding armature 45 and the stator 42 so that the armature 45 is made immovable. In this state, there may be a case where the other spool 30 is moved from the initial position in response to excitation of the corresponding solenoid 44 by the control circuit 80, because the control circuit 80 cannot detect that the one spool 30 is made immovable. In this case, the inner end of the other spool 30 is abutted against the inner end of the above one spool 30 maintained stationary, before the other spool 30 is moved the distance $L_a$ (or $L_a'$). In this manner, the pair of spools 30 and 30 interfere mechanically with each other. Accordingly, the passage between the actuator port 16 and the pump port 17 associated with the other spool 30 cannot be opened, making it impossible to bring the corresponding clutch mechanism 70b (or 70a) to the ON position. Because of the mechanical interference, both the clutch mechanisms 70a and 70b are not simultaneously brought to their respective ON positions, making it possible to prevent inconveniences such as destruction of the gear train 77 and the like.

It will be seen from the foregoing that when either one of the pair of spools 30 and 30 moves relative to the other spool, the inner end of the other spool 30 serves as a stopper with which the inner end of the one spool 30 is engageable.

Additionally, a pair of another stopper means may be arranged in such a manner that the pair of spools 30 and 30 are engaged respectively with the pair of another stopper means when each of the spools 30 is moved from its initial position toward the axial center of the guide bore 11 by a distance longer than the distance $L_a$ or $L_a'$ and shorter than the distance W.

It is to be understood that the invention is not limited to the above-described embodiment, but various changes and modifications can be made to the invention. For instance, the above-mentioned electromagnetic proportional pressure control valve may be utilized as a pilot valve to control a subject to be controlled, through a main control valve.

In addition to the electromagnetic proportional pressure control valve, the invention is applicable to other various control valves such as, for example, a so-called ON-OFF valve and the like. In this ON-OFF valve, each of a pair of spools is movable between an open position where a corresponding one of a pair of flow passageway means is opened and a closed position where the flow passageway means is closed. One of the open and closed positions of one of the pair of spools is determined by abutment of the one spool against stopper means by coil spring means, while the other position of the one spool is determined by abutment of the one spool against the other spool under the force of the electromagnetic drive means against the biasing force of the coil spring means. The moving distance of each spool between the open and closed positions is equal to the distance between the inner ends of the respective spools which are in their respective initial positions. The invention is also applicable to a control valve in which right- and left-hand half portions thereof are asymmetric to each other.

What is claimed is:

1. An electromagnetic proportional pressure control valve for controlling a forward clutch and a rearward clutch, said valve comprising:

(a) housing means formed therein with a guide bore extending straight, tank port means having one end thereof opening to an axial central portion of a peripheral wall surface of said guide bore and the other end adapted to be connected to a tank, a pair of pump ports having their respective one ends opening to the peripheral wall surface of said guide bore on both sides of the location where said tank port means opens to the peripheral wall surface of said guide bore, the other ends of the respective pump ports being adapted to be connected to a common pump, and a pair of actuator ports, each of said pair of actuator ports having one end thereof opening to the peripheral wall surface of said guide bore at a location between a location where a corresponding one of said pair of pump ports opens to the peripheral wall surface of said guide bore and a location where said tank port means opens to the peripheral wall surface of said guide bore, the other end of one of the actuator ports being adapted to be connected to said forward clutch, the other end of the other actuator port being adapted to be connected to said rearward clutch;

(b) a pair of spools accommodated within said guide bore in said housing means in coaxial relation to each other for axial movement relative to said housing means, said pair of spools having their respective inner ends facing toward each other, said inner ends being spaced away from each other when said pair of spools are in their respective initial positions, wherein an entire region by which said inner ends are spaced away from each other defines a moving region by which each of said inner ends is movable, wherein each of said pair of spools is provided on its outer peripheral surface with a pair of axially spaced annular lands, one of said pair of lands being smaller in pressure receiving area than the other land, wherein when each of said pair of spools is in its initial position, one of the pair of lands on the spool is spaced away from a corresponding one of a pair of first sections of the peripheral wall surface of said guide bore, each first section extending between said tank port means and a corresponding one of said pair of actuator ports, thereby permitting flow of the hydraulic fluid between said tank port means and the actuator port, and the other land on the spool is in contact with a corresponding one of a pair of second sections of the peripheral wall surface of said guide bore, each second section extending between a corresponding one of said pair of actuator ports and a corresponding one of said pair of pump ports, thereby intercepting flow of the hydraulic fluid between the actuator port and the pump port, and wherein, supposing that a distance between the inner ends of the respective spools in their respective initial positions is W, axial distances by which the one lands of the respective spools are spaced respectively away from said first sections when said spools are in their respective initial positions are Lx, and distances by which the other lands of the respective spools are in contact respectively with said second sections when said pair of spools are in their respective initial positions are La, the following conditions are satisfied:

$La \geq Lx;$ $W > La;$ and $W \leq 2La,$ (c) a pair of stopper means with which outer end portions of said pair of spools are engageable, to determine said initial positions respectively;
(d) a coil spring which is arranged under compression between the inner ends of the respective spools to bias them toward their respective initial positions; and
(e) a pair of electromagnetic drive means for controlling movements of the respective spools independently of each other, said pair of electromagnetic drive means being mounted to opposite end portions of said housing means respectively, each of said pair of electromagnetic means comprising a solenoid, an armature electromagnetically communicated with said solenoid and a communicating member for mechanically communicating said armature with corresponding one of said pair of spools, wherein when said pair of electromagnetic drive means are in their respective unexcited states, said pair of spools are in their respective initial positions, wherein said pair of electromagnetic drive means apply forces respectively to said pair of spools substantially in proportion to electric current supplied respectively to said pair of electromagnetic drive means, wherein a second force is produced by application of pressure of the hydraulic fluid at each of said pair of actuator ports, to the pair of lands on a corresponding one of said pair of spools, which are different in pressure receiving area from each other, the second force being reverse in direction to the first-mentioned force due to a corresponding one of said pair of electromagnetic drive means, and wherein when the first-mentioned force and the second force are balanced with each other, the pair of lands on the spool are in contact respectively with a corresponding one of said pair of first sections and a corresponding one of said pair of second sections of the peripheral wall surface of said guide bore, thereby intercepting flow of the hydraulic fluid between the actuator port and said tank port means and flow of the hydraulic fluid between the actuator port and a corresponding one of said pair of pump ports.

2. An electromagnetic proportional pressure control valve according to claim 1, wherein a pair of recesses are formed respectively in the facing inner end faces of the respective spools, wherein said coil spring has opposite ends thereof which are received respectively in said recesses, in such a manner that the inner ends of the respective spools are engageable directly with each other.

* * * * *